Sept. 12, 1967   R. G. BOARD ET AL   3,341,150
RETRACTABLE SAFETY BELT
Filed June 16, 1965   2 Sheets-Sheet 1

INVENTORS
RICHARD G. BOARD
NELSON H. SHAPIRO
BY  Shapiro and Shapiro
ATTORNEYS

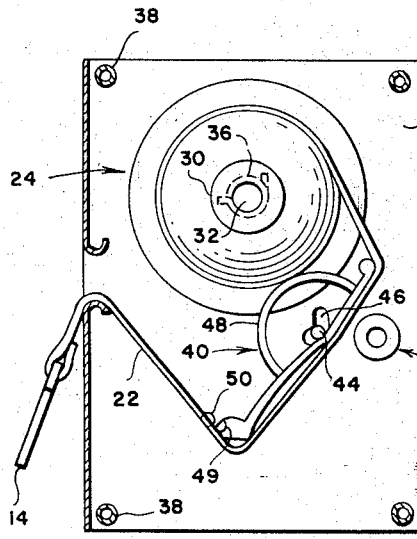
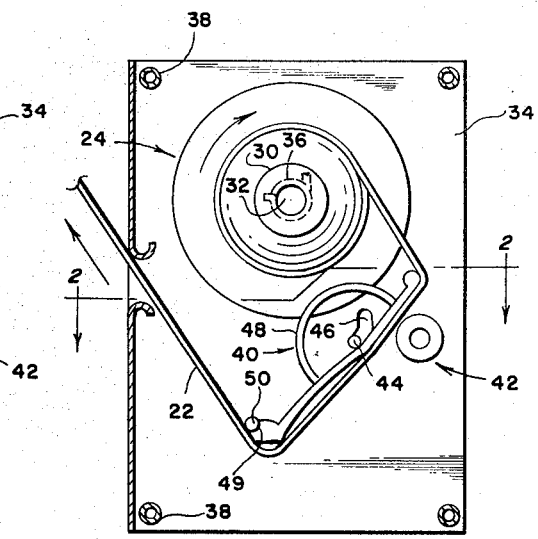
FIG. 4    FIG. 5
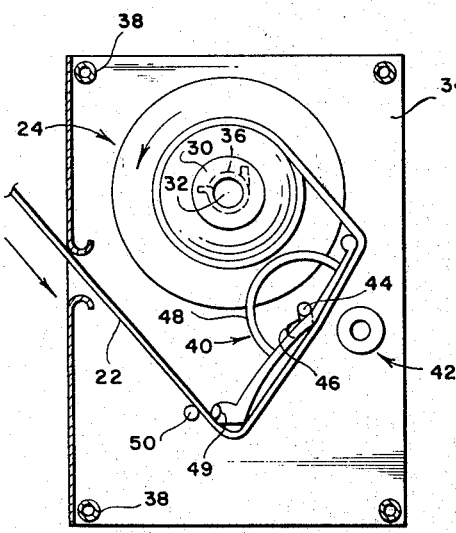
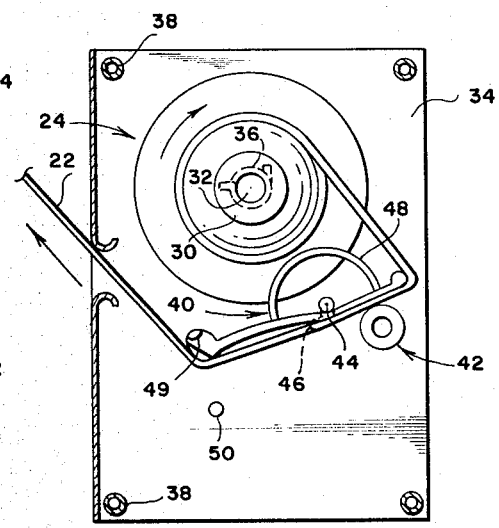
FIG. 6    FIG. 7

United States Patent Office 3,341,150
Patented Sept. 12, 1967

3,341,150
RETRACTABLE SAFETY BELT
Richard G. Board, Bethesda, Md. (3000 Connecticut Ave. NW., Washington, D.C. 20008), and Nelson H. Shapiro, Hyattsville, Md. (640 Washington Bldg., Washington, D.C. 20005)
Filed June 16, 1965, Ser. No. 464,369
29 Claims. (Cl. 242—107.2)

This application is a continuation-in-part of Ser. No. 444,658, filed Apr. 1, 1965, and entitled, "Retractable Safety Belt."

This invention relates to retractable safety belts and more particularly to so-called retractable seat belts for use in automotive vehicles.

The foregoing co-pending application discloses and claims retractable seat belt apparatus in which a strap having a fastener member at a free end thereof may be grasped by the user and extended from a retraction device to place the strap in user-restraining position, whereupon further extension of the strap is prevented automatically in response, for example, to the cessation of the extensile movement or to slight retractile movement of the strap. At the user-restraining position the strap may have any selected length within a wide range of lengths, so as to accommodate varying conditions of user size and clothing. The fastener member is engaged with a mating fastener member in order to complete the belt. When the fastener members are disengaged, the strap retracts automatically.

The co-pending application also discloses retractable seat belt apparatus and the like having a member past which a strap is trained, the member being moved automatically to a first position when the strap is retracted, remaining in that position during extension of the strap, and moving automatically to a second position when extensile movement of the strap ceases. At the second position the member serves to prevent further extensile movement of the strap.

More specifically, the co-pending application discloses and claims the concept of utilizing a clamp which opens automatically during retraction of the strap, remains open until the strap has been extended to the desired length, and then closes automatically. The clamp has a moving clamp part and a fixed clamp part. The strap is trained from a retraction reel, between the clamp parts, and about the moving clamp part in such a way that a force exerted by the user upon the belt after the belt has been fastened closes the clamp to prevent extension of the belt, and a force exerted upon the moving clamp part by the reel opens the clamp during retraction. In addition to pivotal movement to provide the clamping function, the moving clamp part is supported for translational movement to provide a disabling function, that is, to prevent the closing of the clamp during the extension of the strap to the desired user-restraining position. Further, by virtue of the manner in which the strap is trained about the moving clamp part, a buffering action is provided which prevents the reel from taking up increments of slack after the belt is fastened.

It is a principal object of the present invention to provide improvements upon the retractable seat belt apparatus and the like disclosed in the said co-pending application.

A more specific object of the invention is to provide retractable seat belt apparatus and the like having an improved moving clamp part with an improved feeler mechanism for sensing the amount of strap wound upon a retraction reel and for controlling the operation of the moving clamp part.

Briefly stated, but without limitation, the improvement of the present invention concerns a clamp plate supported for pivotal and translational movement by pivot pins mounted in slots upon a frame or housing, the clamp plate having a cylindrical feeler or pusher member concentric with the pivot pins. This modification of the apparatus disclosed and claimed in the said co-pending application produces improved operation as will be later described.

The foregoing and other objects, advantages, and features of the invention, and the manner in which the same are accomplished, will become more readily apparent upon consideration of the following detailed description of the invention taken in conjunction with the accompanying drawings, which illustrate preferred and exemplary embodiments, and wherein:

FIGURES 4–7 are longitudinal sectional views illustrating different positions assumed by the moving clamp part in the course of the operation of the invention.

Figure 1:
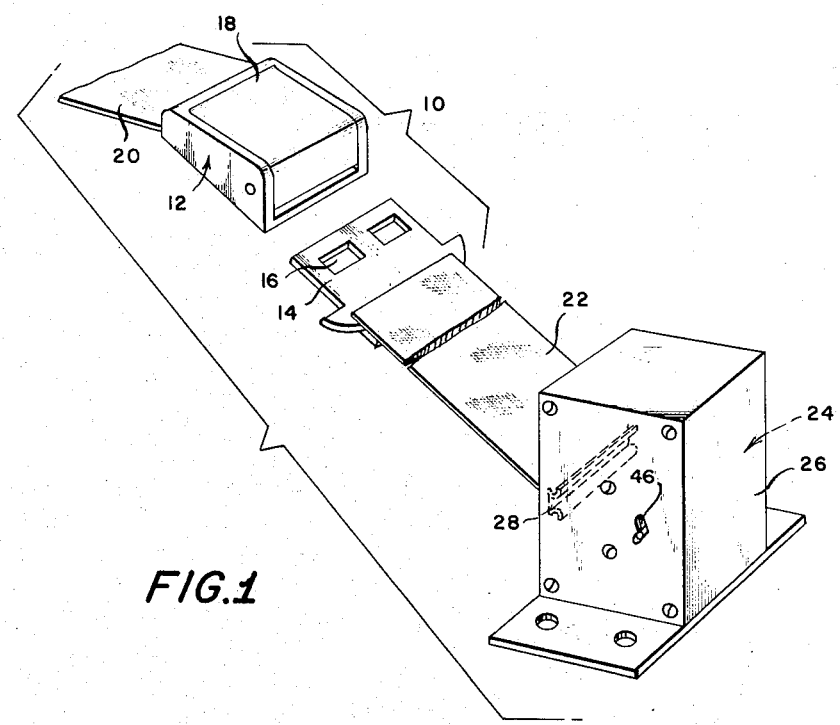
FIGURE 1 is a fragmentary perspective view illustrating the external appearance of housing, strap, and fastener components of a typical embodiment of retractable belt apparatus in accordance with the invention.

Referring to the drawings, and initially to FIGURE 1 thereof, reference numeral 10 designates a conventional seat belt fastener couple comprising a buckle 12 and a tongue 14. The fastener parts may have the usual construction, the buckle comprising a housing having an access opening at the front for reception of the tongue and including the usual locking abutments which enter the openings 16 of the tongue so as to retain the tongue in the buckle until the buckle release lever 18 is actuated. A strap 20 affixed to the buckle may have its distal end anchored to the floor of the vehicle at one side of the seat, for example. This strap may be kept quite short, may be rigidified, and need not be adjustable. Strap 22, such as nylon webbing, is affixed to the tongue and is arranged to be retracted and extended with respect to the retraction device 24, which may be a spring wound retraction reel supported for rotation in a housing or casing 26 anchored to the floor of the vehicle at the opposite side of the seat, for example. The housing may be appropriately contoured to minimize space requirements and for esthetic reasons, and it may have an opening 28 through which the strap 22 moves and at which the tongue 14 is located when the strap is fully retracted. This opening may, in effect, be extended toward the user by the use of a conventional boot or tube which guides the strap to the rest position of the tongue.

As is well known in the art, the reel 24 may comprise a tubular hub 30 having bearings (not shown) at each end for supporting the hub for rotation upon a pin 32 extending through the hub and fixed between side plates 34 of a frame, which may be part of the housing 26. A helical torsion spring 36 is received loosely within the hub between the hub and the pin 32 and has one end fixed to the pin and the other end fixed to the hub, so that the spring is wound when the reel is turned in a direction to extend the strap. Other types of reels, such as those using spiral clock springs at the ends, may also be used. The side plates 34 may be joined by spacers 38. It will thus be apparent that the tongue 14 may be grasped to extend the strap 22 from the housing 26, turning the reel 24 and winding the spring 36, and that when the tongue is released, the reel will be turned by the spring, winding up the strap so as to retract it into the housing.

Figure 3:
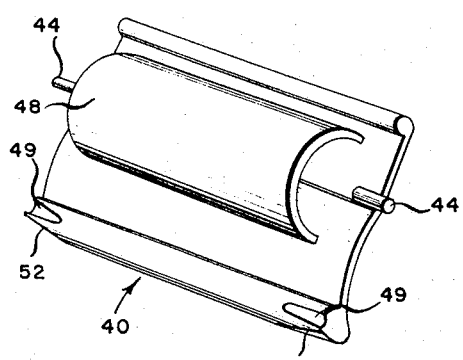
FIGURE 3 is a perspective view of a moving clamp part employed in the invention.

A clamp is employed for preventing extension of the strap when the strap has been extended to the desired user-restraining position. The clamp comprises a moving clamp part 40 and a fixed part 42. The fixed clamp part may simply be a bar or rod extending between and mounted at its ends upon the side plates 34. As shown in FIGURE 3, the moving clamp part may be a suitably shaped plate of generally rectangular outline provided with a pair of laterally extending pivot pins 44, which may be integral with the plate. The pivot pins extend into slots 46 of the side plates 34 with sufficient play to permit pivotal and translational movement of the clamp plate, which fits transversely between the frame side plates 34 with just enough clearance to permit such movement. The slots may be generally crescent shaped (see FIGURE 4). The outer slot edge is smoothly curved, while the inner slot edge (toward the reel) is a stepped configuration to provide a shelf on which the pins rest during extension of the strap. The orientation of the slots is such that the bisector of the angle formed by each slot is directed upwardly at about 30 degrees in the general direction in which the strap is pulled.

The lower portion of the clamp plate (below the slots) may be upwardly convex and the upper portion (above the slots) essentially flat. The surface of the clamp plate facing the reel has a generally cylindrical section pusher member 48 affixed thereto concentrically with the pivot pins 44 and adapted to engage the webbing wound upon the reel when the strap is retracted. If the reel has end discs, member 48 will, of course, fit between them with some clearance.

Figure 2:
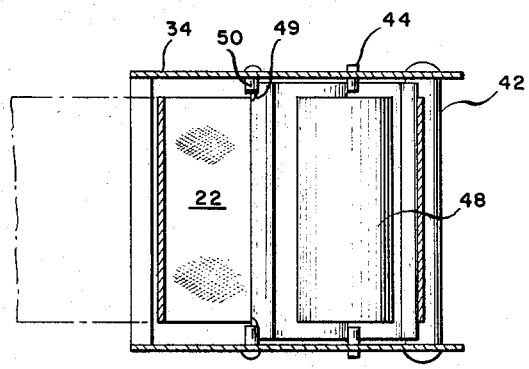
FIGURE 2 is a sectional view taken along line 2—2 of FIGURE 5.

Both the lower or leading edge and the upper or trailing edge of the moving clamp plate are shown smoothly curved, the strap being trained from one side of the reel past the upper edge of the plate, between the plate and the fixed clamp part 42, along the outer surface of the plate, around the lower edge of the plate, and then upwardly at an appropriate angle past the other side of the reel. Adjacent to its lower edge the clamp plate is formed at its lateral extremities with shallow notches 49, which are adapted to engage and receive short stop pins 50, which project laterally inward from the side plates 34 (see FIGURE 2).

In the position of the clamp plate shown in FIGURE 7 the pivot pins 44 are at the top of the slots 46, and the pressure exerted upon the lower end of the clamp plate by the tension in the strap leading to the tongue 14 turns the clamp plate so that it clamps the strap against the fixed clamp part 42. The clamping pressure is determined by the relative length of the lever arms between the pivot pins and the lower edge of the clamp plate and between the pivot pins and the portion of the clamp plate adjacent to the fixed clamp part. This may be a favorable ratio of the order of two to one, three to one, or even more. The clamping pressure is also determined by the angle of pull of the portion of the strap extending to the tongue with respect to the lever arm extending between the lower edge of the clamp plate and the pivot pins. This angle may be of the order of 90 degrees, for example. The harder the pull upon the strap, the tighter the clamping. The actual clamping surfaces may be smooth, or one or both of them (preferably just the fixed part, which does not normally engage the strap during movement thereof) may be roughened or knurled. The upper edge of the clamp plate preferably idents the strap, as shown in FIGURE 7, at least when the clamp is closed, for a purpose to be described.

When the strap is fully retracted, the moving clamp part will have the position shown in FIGURE 4. If now the strap is extended, the lower edge of the clamp plate will move slightly, due to the drag of the strap over the clamp plate on its outer surface as well as on the surface of pusher member 48, so as to seat the stop pins 50 in the notches 49. In this movement of the clamp plate the pivot pins 44 will move to the bottom of the slots as can be seen from FIGURES 4 and 5.

The clamp plate will remain in the position of FIGURE 5, as long as the strap is pulled during extension of the strap to the user-restraining position. If now the strap is relaxed slightly, during fastening of the belt, the clamp plate will turn away from the stop pins, as shown in FIGURE 6, due to the strap-tension pressure on the upper edge of the clamp plate, and will slide upwardly to the top of the slots due to the strap-tension upward pressure on the lower edge of the clamp plate. Any further pull upon the strap will turn the clamp plate and cause the clamp to close as shown in FIGURE 7, preventing extension of the strap. If now the belt is unfastened the clamp will move to the open position of FIGURE 4. As the webbing winds upon the reel, it will finally engage the pusher member 48 and will press the clamp plate downwardly along the slots almost to the bottom thereof. The pivot pins 44 do not quite reach the bottom of the slots, because the direction of the force exerted on the pusher member is not advantageous for movement of the pivot pins adjacent to the bottom of the slots, which are generally tangential, rather than radial to the reel at that point (portions of the slots closer to the reel being generally radial).

The effect of the slots 46 is to permit the clamp plate to move between a first position, at which turning (and hence clamping) is obstructed by stop pins 50, and a second position at which turning (and hence clamping is unobstructed. The clamp plate thus becomes its own "latch" to prevent clamping during extension of the strap.

By virtue of the concentricity of the cylindrical pusher member and the pivot pins 44, the same pressure is exerted upon the pusher member by the webbing wound on the reel regardless of the pivotal position of the clamp plate. When the clamp plate turns as the strap is initially extended, the pusher member does not exert increased back pressure upon the webbing on the reel, and binding of the reel is avoided. Thus the clearance between the stop pins and the lower edge of the clamp plate may be made sufficient to prevent any possibility of jamming during retraction.

Movement of the clamp plate to a fully open position during retraction is due substantially entirely to the pressure of the webbing upon the upper or trailing edge of the plate. As the webbing on the reel presses upon the pusher member and causes the pivot pins to move downwardly in the slots, the clamp plate will be in a fully open position, so that the lower edge will move behind and under the stop pins.

The surface of the lower edge of the clamp plate at its lateral extremities may be tapered or contoured, as shown at 52 in FIGURE 3, as may the upper surface of the stop pins 50, to facilitate passage of the moving clamp part past the stop pins to the rest position of FIGURE 4.

The same buffering action described in the co-pending application is also available in the present invention, strap-tension pressure on the upper edge of the clamp plate acting as a return spring to turn the clamp plate to its open position and the strap being alternately more indented by the upper and lower edges of the clamp plate during pivotal movement of the clamp plate without movement of the strap past the surface of the clamp plate.

While a preferred embodiment of the invention has been shown and described, it will be apparent to those skilled in the art that changes can be made without departing from the principles and spirit of the invention, the scope of which is defined in the appended claims. For example, modifications have been suggested in the aforesaid co-pending application, the disclosure of which is incorporated herein by reference. Accordingly, the foregoing embodiments are to be considered illustrative, rather than restrictive of the invention, and those modifications which come within the meaning and range of equivalents of the claims are intended to be included therein.

The invention claimed is:

1. A retractable belt comprising a frame having a pair of side plates, a retraction reel supported for rotation between said side plates, a clamp having a moving, generally rectangular clamp plate and a fixed clamp bar, said clamp plate having a trailing edge and a leading edge, a strap connected to said reel for retraction and extension, means for supporting said clamp plate upon said side plates for translational movement toward and away from said reel and for pivotal movement with respect to said clamp bar, said clamp plate having on the side thereof adjacent to said reel a cylindrical section pusher member concentric with the axis of pivotal movement of said clamp plate and engaging the strap wound upon said reel, when a predetermined amount of strap has been retracted, for moving said clamp plate toward a position away from said reel, means for restricting movement of said clamp plate at said position, means training said strap from one side of said reel past said trailing edge, between said clamp plate and said clamp bar, along the side of said clamp plate remote from said reel, around the leading edge of said clamp plate and past the opposite side of said reel for exerting a force upon said clamp plate to maintain said clamp plate engaged with said restricting means during extension of said strap to a useful position, and thereafter, when said strap is relaxed somewhat, to move said clamp plate to a position adjacent to said reel, at which said clamp plate is free to turn and clamp said strap against said clamp bar in response to an extensile pull upon said strap.

2. The retractable belt of claim 1, said means for restricting movement of said clamp plate comprising a pair of stop members engaging lateral portions of said clamp plate.

3. The retractable belt of claim 2, said stop members comprising pins extending from said side plates, said lateral portions being contoured to receive said pins.

4. The retractable belt of claim 1, said means for supporting said clamp plate upon said side plates comprising a pair of slots in said side plates and a pair of pivot pins upon said clamp plate extending into said slots and guided thereby.

5. The retractable belt of claim 4, said slots having a first portion extending generally radially with respect to said reel and a second portion remote from said reel and generally tangential.

6. The retractable belt of claim 5, the shape of said slots being correlated with the direction of pressure on said pusher member so that said pivot pins are moved by said pusher member not quite to the end of said slots removed from said reel, said pivot pins being moved further toward said end in response to the initial extensile pull upon said strap.

7. A retractable belt comprising a frame, a retraction reel supported for rotation upon said frame, a clamp having a moving clamp part and a fixed clamp part, means for mounting said fixed clamp part upon said frame, means for supporting said moving clamp part upon said frame for translational movement toward and away from said reel and for pivotal movement with respect to said fixed part, a strap connected to said reel for retraction and extension, said moving clamp part having a trailing edge and a leading edge and having a curved pusher member on the side thereof adjacent to said reel, said pusher member extending around the axis of the pivotal movement of said moving part and engaging the strap wound upon said reel for receiving pressure therefrom when a predetermined amount of strap has been retracted and for moving said moving part toward a position away from said reel, means for restricting movement of said moving part at said position, and means training said strap from one side of said reel past said trailing edge, between said moving part and said fixed part, along the side of said moving part remote from said reel, around the leading edge of said moving part and past the opposite side of said reel for exerting a force upon said moving part to maintain said moving part engaged with said restricting means during extension of said strap to a useful position, and thereafter, when said strap is relaxed somewhat, to move said moving part to a position adjacent to said reel, at which said moving part is free to turn and clamp said strap against said fixed part in response to an extensile pull upon said strap.

8. A retractable belt or the like comprising a retraction device, a strap connected to said device for retraction and extension, a strap guide, means supporting said guide for translation movement between a first position and a second position and for pivotal movement, means for restricting pivotal movement of said guide at said first position, said guide being adapted to translate to said first position after said strap is retracted a predetermined amount, means orienting said strap from said retraction device about said guide for exerting a force thereon and for causing said guide to move said second position upon a change in said force when said strap has been extended to a useful position, and means responsive to the pivotal movement of said guide at said second position for preventing extension of said strap.

9. The retractable belt of claim 8, said guide comprising a moving clamp part, said means for preventing extension of said strap including a fixed clamp part.

10. A retractable belt or the like comprising a frame having a pair of side plates, a retraction reel support for rotation between said side plates, a strap connected to said reel for retraction and extension, a clamp having a moving clamp part supported upon said side plates for translational and pivotal movement and having a fixed clamp part supported upon said side plates, said moving clamp part being adapted to translate substantially to a first position after said strap is retracted a predetermined amout, means restricting the pivotal movement of said moving clamp part at said first position, means orienting said strap from said reel and about said moving clamp part for exerting a force thereon and for causing said moving clamp part to translate to a second position in response to a change in said force after said strap has been extended to a useful position, said moving clamp part being free to pivot toward said fixed clamp part at said second position and to clamp said strap therebetween for preventing extension of said strap.

11. The retractable belt of claim 10, said moving clamp part having pivot pins supported in slots of said side plates.

12. The retractable belt of claim 10, said moving clamp part being a generally rectangular plate having a leading edge and a trailing edge, said trailing edge being located adjacent to said fixed clamp part, said strap extending from said reel past said trailing edge and then past said leading edge with a change in direction.

13. The retractable belt belt of claim 12, said means for restricting the pivotal movement of said moving clamp part at said first position comprising a pair of stops engaging correspondent lateral portions of said moving clamp part adjacent to said leading edge.

14. The retractable belt of claim 12, said moving clamp part having a pair of laterally extending pivot pins supported in slots of said side plates, said slots being shaped to guide the movement of said pivot pins in a first direction and in a second direction transverse thereto.

15. The retractable belt of claim 14, said slots being crescent-shaped.

16. The retractable belt of claim 14, said slots having a first portion which is generally radial to the reel and a second portion which is generally tangential to the reel.

17. The retractable belt of claim 12, the trailing edge of said moving clamp part indenting said strap and to a greater extent when said clamp is closed than when said clamp is open, the leading edge of said clamp part indenting said strap and to a greater extent when said clamp is open than when said clamp is closed.

18. A retractable belt or the like comprising a retraction device, a strap connected to said retraction device for retraction and extension, a clamp having a moving clamp part and a fixed clamp part, means supporting said moving clamp part for translational movement between a first position and a second position and for pivotal movement, means training said strap between said moving clamp part and said fixed clamp part and reversely about said moving clamp part for exerting a force on said moving clamp part to cause it to translate from said first position to said second position, said moving clamp part being free to pivot and clamp said strap against said fixed clamp part when said moving clamp part is in said second position, and means for preventing pivotal clamping movement of said moving clamp part when said moving clamp part is in said first position.

19. A retractable belt or the like comprising a frame having a pair of side plates, a retraction reel supported for rotation between said side plates, a strap connected to said reel for retraction and extension, a generally rectangular clamp plate having a trailing edge and a leading edge, said clamp plate being supported upon said side plates for translational movement toward and away from said reel and for pivotal movement about an axis between said edges, means training said strap from one side of said reel past said trailing edge, then around said leading edge and past the opposite side of said reel for moving said clamp plate toward said reel in response to the rectractile force of said reel, a fixed clamp part against which said strap may be clamped by said clamp plate only when said clamp plate is toward said reel, said clamp plate being adapted to move away from said reel after said strap has been retracted a predetermined amount, and means for holding said clamp plate away from said reel during extension of said strap to a useful position.

20. A retractable belt comprising a frame having a pair of side plates, a retraction reel supported for rotation between said side plates, a clamp having a moving, generally rectangular clamp plate and a fixed clamp bar, said clamp plate having a trailing edge and a leading edge, a strap connected to said reel for retraction and extension, means for supporting said clamp plate upon said side plates for translational movement toward and away from said reel and for pivotal movement with respect to said clamp bar, said clamp plate having a pusher member mounted thereon on the side thereof adjacent to said reel and engaging the strap wound upon said heel when a predetermined amount of strap has been retracted for moving said clamp plate to a first position away from said reel, means for restricting movement of said clamp plate at said first position, means training said strap from one side of said reel past said trailing edge, between said clamp plate and said clamp bar, along the side of said clamp plate remote from said reel, around the leading edge of said clamp plate and past the opposite side of said reel for exerting a force upon said clamp plate to maintain said clamp plate engaged with said restricting means during extension of said strap to a useful position, and thereafter, when said strap is relaxed somewhat, for moving said clamp plate to a second position, adjacent to said reel, at which said clamp plate is free to turn and clamp said strap against said clamp bar in response to an extensile pull upon said strap.

21. The retractable belt of claim 20, said means for restricting movement of said clamp plate at said first position comprising a pair of stop members engaging lateral portions of said clamp plate.

22. The retractable belt of claim 21, said stop members comprising pins extending from said side plates, said lateral portions being contoured to receive said pins.

23. The retractable belt of claim 20, said means for supporting said clamp plate upon said side plates comprising a pair of slots in said side plates and a pair of pivot pins upon said clamp plate extending into said slots and guided thereby.

24. The retractable belt of claim 23, said slots having a first portion extending generally radially with respect to said reel and a second portion remote from said reel and generally tangential.

25. The retractable belt of claim 23, the positions and orientation of said slots being correlated with the position of said pusher members so that the pivot pins are moved by said pusher member to a position not quite at the end of said slots remote from said reel, said pivot pins being moved further toward said end in response to the initial extensible pull upon said strap.

26. A retractable belt or the like comprising a spring-wound retraction reel, a strap connected to said reel for retraction and extension, a strap guide supported adjacent to said reel for translational movement between a first position away from said reel and a second position near said reel and for pivotal movement about an axis substantially parallel to the rotational axis of said reel, said guide having means for moving said guide substantially to said first position only when a predetermined amount of strap is retracted, stop means for restricting movement of said guide at said first position, means orienting said strap from said reel around said guide and beyond for exerting a force on said guide and causing said strap to urge said guide into engagement with said stop means when said strap is extended following retraction of said predetermined amount, and thereafter upon reduction in tension of the strap beyond said guide, for causing said strap to move said guide to said second position, and means responsive to pivotal movement of said guide at said second position for preventing extension of said strap.

27. A retractable belt or the like comprising a frame having a pair of side plates, a spring-wound retraction reel supported for rotation between said side plates, a strap connected to said reel for extension and retraction, a clamp having a fixed part supported between said side plates and a moving part supported between said side plates for translational movement toward and away from said reel and for pivotal movement toward and away from said fixed part, stop means in the path of pivotal movement of said moving part when said moving part is away from said reel, for holding said moving part away from said reel and for restricting pivotal movement of said moving part to prevent clamping operation of said clamp, and means orienting said strap from said reel between said clamp parts, and around said moving clamp part for exerting a force upon said moving clamp part to maintain engagement of said moving clamp part with said stop means during extension of said strap from a retracted condition and for moving said moving clamp part toward said reel thereafter.

28. In a retractable belt, a retraction reel, a strap connected to said reel for retraction and extension, a strap clamp having a moving part and a fixed part, means supporting the moving part for pivotal clamping movement relative to said fixed part and for translational movement toward and away from said reel, means engaging the strap wound upon said reel for causing said moving part to translate away from said reel when said strap is retracted a predetermined amount, means training said strap about said moving part for exerting a force thereon to cause it to translate further to a predetermined position during extension of said strap to a useful position, and means for restricting pivotal movement of said moving part at said predetermined position.

29. In a retractable belt or the like, a frame, a spring-motivated retraction device supported upon said frame, a strap connected to said retraction device for retraction and extension, means for preventing extension of said strap, said means comprising a fixed clamp part supported upon said frame and a moving clamp part supported upon said frame for translational movement toward and away from said retraction device and for pivotal movement toward and away from said fixed clamp part, means training said strap from said retraction device about said moving clamp part for exerting forces thereon to turn said moving clamp part toward and away from said fixed clamp part and for causing said moving clamp part to translate toward said retraction device.

References Cited
UNITED STATES PATENTS

| | | | |
|---|---|---|---|
| 3,205,004 | 9/1965 | Spouge | 297—388 |
| 3,246,929 | 4/1966 | Taggart | 297—388 |

FRANK J. COHEN, *Primary Examiner.*

W. S. BURDEN, *Assistant Examiner.*